J. D. SARVEN.
Thill-Coupling.
No. 14,931.
Patented May 20, 1856
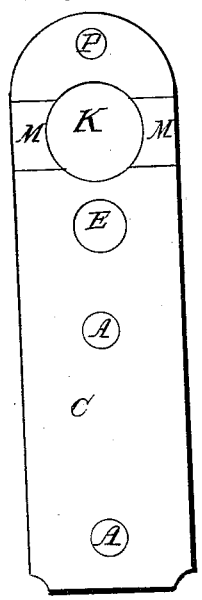
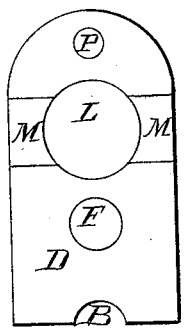
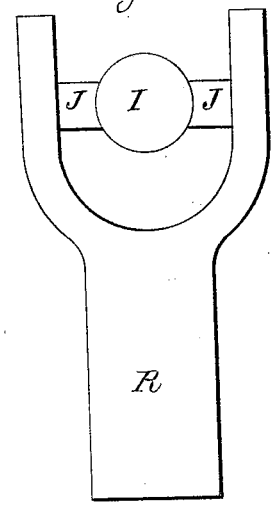
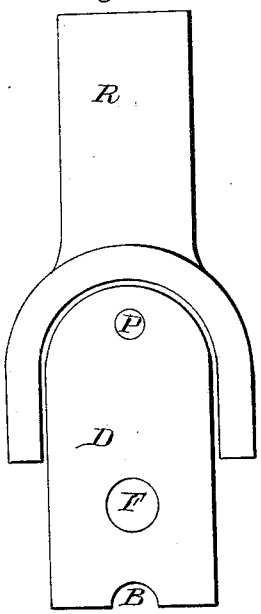
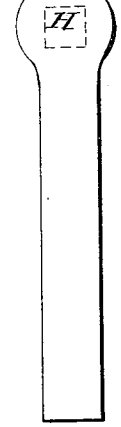
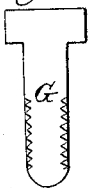
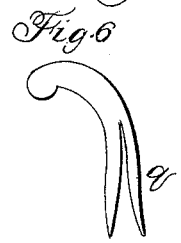
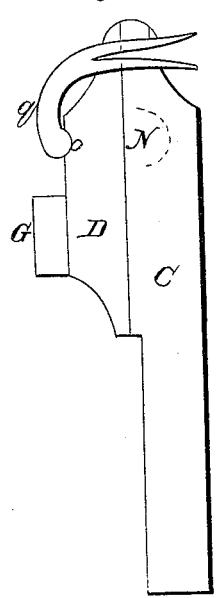
Inventor
Jas. D. Sarven

UNITED STATES PATENT OFFICE.

JAS. D. SARVEN, OF COLUMBIA, TENNESSEE.

CARRIAGE-SHAFT COUPLING.

Specification of Letters Patent No. 14,931, dated May 20, 1856.

*To all whom it may concern:*

Be it known that I, JAMES D. SARVEN, in the town of Columbia, county of Maury, in the State of Tennessee, have invented a new and Improved Carriage-Shaft Fastener for the Purpose of Attaching Shafts or Tongues to a Carriage; and I do hereby declare that the following is a full and exact description thereof, reference being had to the accompanying drawings and to the letters of reference marked thereon.

The nature of my invention consists in employing a journal for shaft irons enlarged in the center so as to form a globular ellipsoidal or double conical bearing surface. Clamped between clip irons countersunk, by means of a set screw so that the wear is entirely upon the enlarged surface preventing all lateral motion and rattling of the clip irons and in the employment of the leather packing as described for the purpose of retaining the lubricating material.

To enable others skilled in the art to make and use my invention I will proceed to describe its construction and operation.

Figures 1 and 2 represent the clip irons which I fasten to the axle of a carriage by any of the common modes.

A, A Fig. 1 represents openings for that purpose also the half circle B Fig. 2.

C, Fig. 1 represents the bottom clip iron and D Fig. 2 the top clip iron which I fasten together by means of a set screw passing through the openings shown by E Fig. 1 and F Fig. 2.

I cut a thread in the opening E Fig. 1 and a corresponding thread on the set screw G Fig. 5 and by inserting and turning the set screw I connect the two clip irons firmly together.

Fig. 7 is a side view and shows the clip irons fastened together by the set screws. The clip irons Figs. 1 and 2 I countersink, in order that they may receive the enlarged portion of the journal of the shaft iron but I do not countersink them sufficiently deep or large to allow the clip irons to come together. I countersink them so that the countersunk portions bear upon the enlarged part of the journal thereby preventing lateral motion. The space between the clip irons not occupied by the enlarged part of the journal, which space is nearly $\frac{3}{16}$ of an inch, I fill by plies of leather. Some of the plies pass under the necks of the journal and some over the necks for the purpose of retaining the lubricating material used on the journal, and when the enlarged part of the journal or countersunk portion of the clip irons becomes worn by use I remove a portion of the leather and tighten the set screw Fig. 5 to prevent rattling.

R Fig. 3 is the jack iron which I fasten to the shafts in any of the usual modes and into which I fasten firmly the journal of the shaft iron by its necks, J, J, passing through openings in each side of the jack iron.

Fig. 4 is a side view of the jack iron and the opening to receive the necks of the journal is shown at H by the dotted lines.

I Fig. 3 represents the enlarged part of the journal and, J, J the necks of the journal.

K Fig. 1 and L Fig. 2 show the countersunk portion of the clip irons to receive the enlarged portion of the journal, I.

M M M M Figs. 1 and 2 show the cavities to receive the necks J, J of the journal. These cavities I make of such size that they do not come in contact with the necks of the journal. In order that the necks may retain their original size and strength the leather that I use between the clip irons fills the space between the necks and the cavities, whereby the lubricating substance is retained. A half section of the cavity is shown by the dotted lines N Fig. 7.

G Fig. 5 is the set screw.

$v$ Fig. 6 represents the spring key which I use for the purpose of covering the opening O which is made in the top clip iron for the purpose of oiling the journal. It serves also to keep the clip irons in their proper place.

P P, Figs. 1 and 2 show the openings to receive the spring key Fig. 6.

Fig. 8 is a top view of the coupling connected together, but the set screw and steadying or oil spring key are not shown. The clip irons I in general make of iron $\frac{1}{2}$ inch thick and $1\frac{1}{4}$ inch wide; the jack irons the same thickness, the width and shape as shown in the drawings accompanying this specification and making part of the same.

By this arrangement the coupling when connected together as herein described and shown by Fig. 8 gives an easy up and down motion to the shafts and prevents lateral play and rattling of the clip irons.

I am aware that the ball and socket or universal joint coupling is old; and that a journal with a spherical enlargement in the center is old, and therefore I do not wish to be understood as claiming either the one or the other. But What I do claim as my invention and desire to secure by Letters Patent is—

1. The improvement upon couplings for carriage shafts or tongues which consists in enlarging the journal of the shaft iron in the center so as to form a globular, ellipsoidal, or double conical, bearing surface, and clamping the same between the clip irons, countersunk as described, by means of screws or other equivalent devices; so that the wear is entirely upon the enlarged surface and all lateral play and rattling of the clip irons are prevented.

2. I also claim in combination therewith the leather packing as described for the purpose of retaining the lubricating material.

JAMES D. SARVEN.

Witnesses:
I. W. HATCHER,
WM. GRIGSBY.